US010631627B2

(12) United States Patent
Peters

(10) Patent No.: US 10,631,627 B2
(45) Date of Patent: Apr. 28, 2020

(54) MAGNETIC SILICONE BRUSH HOLDERS

(71) Applicant: Shelley Peters, Alton (CA)

(72) Inventor: Shelley Peters, Alton (CA)

(*) Notice: Subject to any disclaimer, the term of this patent is extended or adjusted under 35 U.S.C. 154(b) by 703 days.

(21) Appl. No.: 14/544,983

(22) Filed: Mar. 12, 2015

(65) Prior Publication Data

US 2016/0262533 A1 Sep. 15, 2016
US 2020/0060418 A9 Feb. 27, 2020

Related U.S. Application Data

(60) Provisional application No. 61/998,635, filed on Jul. 2, 2014.

(51) Int. Cl.
*A46B 15/00* (2006.01)
*A47G 29/08* (2006.01)
*F16M 13/02* (2006.01)

(52) U.S. Cl.
CPC ...... *A46B 15/0095* (2013.01); *A46B 15/0097* (2013.01); *A47G 29/08* (2013.01); *F16M 13/022* (2013.01)

(58) Field of Classification Search
CPC ...... A47G 29/08; A47G 29/087; B44D 3/123; B44D 3/125; A46B 15/0093; A46B 15/0095; A46B 15/0097
USPC ...................... 211/66, 113, DIG. 1; 248/683
See application file for complete search history.

(56) References Cited

U.S. PATENT DOCUMENTS

| | | | | |
|---|---|---|---|---|
| 742,581 | A * | 10/1903 | Burtch | A47K 1/09 211/65 |
| 2,192,569 | A * | 3/1940 | Williams | A24F 13/22 131/186 |
| 2,279,237 | A * | 4/1942 | Kellems | A47L 13/512 211/66 |
| 2,385,859 | A * | 10/1945 | Jacobson | B26B 21/40 131/254 |
| 2,414,653 | A * | 1/1947 | Lookholder | A47K 1/09 15/220.2 |

(Continued)

FOREIGN PATENT DOCUMENTS

AU  2014101376  12/2014
GB  2366832  * 3/2002  ........... H01F 7/0252

(Continued)

OTHER PUBLICATIONS

Manzelle Kitkat Les priceaus magnetiques de Rae Morris, Nov. 12, 2014 (7 pages).

(Continued)

*Primary Examiner* — Michael Safavi

(57) ABSTRACT

An article of manufacture comprises: a hollow prism of elastomeric material such as silicone having first and second ends; and a permanent magnet prism at the first end of the elastomeric material prism. The second end of the elastomeric material prism is open. A cosmetic brush handle is releasably gripped by the elastomeric material at its open end. The article of manufacture is desirably in combination with a number of cosmetic brushes and a horizontal surface at least partly of magnetic material large enough to accommodate the cosmetic brushes with the permanent magnets engaging the horizontal surface so that the brushes are substantially vertical and their bristles don't touch any surface.

15 Claims, 4 Drawing Sheets

(56) References Cited

U.S. PATENT DOCUMENTS

| | | | | |
|---|---|---|---|---|
| 2,491,860 | A * | 12/1949 | Ingraham | B25C 3/008 211/DIG. 1 |
| 2,642,999 | A * | 6/1953 | McPherson | H01F 7/0252 15/143.1 |
| 3,197,169 | A * | 7/1965 | Burrows | A47L 13/512 248/111 |
| 3,289,990 | A * | 12/1966 | Grantham | A47G 1/17 248/205.3 |
| 3,782,799 | A * | 1/1974 | Hansen | A47K 1/09 211/DIG. 1 |
| 4,462,647 | A * | 7/1984 | Key | A47B 47/03 312/108 |
| 4,905,951 | A * | 3/1990 | Putness | A47L 13/512 211/66 |
| 5,080,230 | A * | 1/1992 | Winnard | B25H 3/06 206/350 |
| 5,163,566 | A | 11/1992 | Hempel | |
| 5,209,694 | A | 5/1993 | Utt | |
| 6,669,031 | B1 * | 12/2003 | Badonic | A47K 1/09 211/66 |
| 7,699,277 | B2 * | 4/2010 | Bagnall | A01K 63/006 119/230 |
| 7,918,620 | B2 * | 4/2011 | Del Ponte | A45C 11/008 132/315 |
| 8,636,260 | B2 * | 1/2014 | Gauger | A46B 17/08 248/110 |
| 8,720,703 | B1 | 5/2014 | Pressler et al. | |
| 8,727,141 | B2 * | 5/2014 | Akalin | A47K 1/09 211/66 |
| 2003/0000900 | A1 * | 1/2003 | Yu | A46B 5/00 211/65 |
| 2003/0070998 | A1 * | 4/2003 | Bulka | A47K 1/09 211/66 |
| 2012/0090117 | A1 | 4/2012 | Akalin et al. | |
| 2013/0154295 | A1 * | 6/2013 | Braswell | F41B 5/1465 294/217 |
| 2013/0306815 | A1 * | 11/2013 | Roncero Blazquez | A47L 13/51 248/206.5 |
| 2013/0333131 | A1 | 12/2013 | McCarthy | |
| 2014/0068922 | A1 | 3/2014 | Roffe | |
| 2015/0052727 | A1 * | 2/2015 | Rosso, Jr. | A47B 67/02 29/428 |
| 2015/0251812 | A1 * | 9/2015 | Gillie | B65D 25/10 248/683 |
| 2015/0289646 | A1 * | 10/2015 | Stapp | F21V 33/004 312/237 |

FOREIGN PATENT DOCUMENTS

| | | | | |
|---|---|---|---|---|
| WO | WO 2010027416 | A2 * | 3/2010 | A46B 7/04 |
| WO | WO-2010027416 | A2 * | 3/2010 | A46B 7/04 |

OTHER PUBLICATIONS

Benjabelle Brush Tree; two pages; admitted prior art www.benjabelle.com/products/original-brush-tree.

* cited by examiner

MAGNETIC SILICONE BRUSH HOLDERS

CROSS-REFERENCE TO RELATED APPLICATION

This application claims the priority of U.S. Provisional Patent Application Ser. No. 61/988,635 filed Jul. 2, 2014, the disclosure of which is incorporated by reference herein.

BACKGROUND AND SUMMARY OF THE INVENTION

The invention relates to simple components that can be utilized to properly store or display brushes, such as cosmetic brushes, and a system and combination of the components with the brushes.

Oftentimes, cosmetic brushes are stored haphazardly in drawers or cosmetic bags, which can easily result in damage to the bristles of the brushes, and/or contaminate the drawer or bag with residual cosmetic material from the brush bristles. Also, after cleaning a brush with water or other liquid, it can be difficult to quickly get the brush to dry properly. According to the invention these problems are avoided in a simple and inexpensive manner.

While there have been other proposals for using magnets to store brushes so that the bristles do not contact other objects, such as shown in U. S. Patent Publications 2003/0070998, 2003/0000900, and 2012/0090117, and U.S. Pat. Nos. 2,642,999 and 5,163,566, typically the mechanisms for mounting the brushes have been wall mounted and/or the mountings are often not as secure or versatile as desired. Also, the mounting mechanisms may be relatively complicated and/or are not particularly well suited for a variety of differently sized brushes, such as is typically provided with a set of cosmetic brushes. The invention has all of the advantages of the prior art proposals, and few or none of the drawbacks. In essence the invention is believed to be the epitome of simplicity yet performs effectively to achieve its desired objectives.

According to one aspect of the invention an article of manufacture is provided which comprises: a hollow prism of elastomeric material having first and second ends; and a permanent magnet prism at the first end of the elastomeric material prism. The second end of the elastomeric material prism is open. The article may further comprise: a handle of a cosmetic brush releasably disposed in the second end of the hollow prism and held in place by the gripping action of the elastomeric material of the hollow prism. The hollow prism may comprise a generally circular cross-section tube and the permanent magnet prism may comprise a solid cylinder or disc. The elastomeric material preferably is silicone, and has a durometer of about 20-70 on the Shore A Scale.

The article of manufacture is desirably in combination with: a plurality of cosmetic brushes, each having a hollow prism and a permanent magnet prism associated therewith; and a substantially horizontal surface at least partly of magnetic material large enough to accommodate the plurality of cosmetic brushes with the permanent magnets associated therewith engaging the horizontal surface so that the brushes are substantially vertical. The substantially horizontal surface may be supported by two substantially upright walls and a base to define an open polygonal (e. g. square, rectangular, trapezoidal, etc.) configuration. Alternatively, the substantially horizontal surface is supported by a central column and a base and the brushes are in a generally circular configuration around the column.

According to another aspect of the invention there is provided a system for supporting a plurality of cosmetic brushes each having bristles and a handle, the system comprising: a substantially horizontal surface at least partially of magnetic material and a support for the substantially horizontal surface; and wherein a plurality of cosmetic brushes are supported at least in part by magnets at the handles opposite the bristles to extend vertically downwardly from the horizontal surface so that the bristles do not engage any surface. The details of alternative supports for the horizontal surface may be as set forth above.

According to a still further aspect of the invention there is provided a method of mounting, storing, and using a plurality of different cosmetic brushes each having bristles and a handle. The method comprises: a) providing a substantially horizontal surface at least partially of magnetic material; b) providing a magnet operatively associated with a portion of each of the brush handles opposite the bristles; and c) vertically suspending the plurality of different cosmetic brushes supported by the magnets operatively engaging the substantially horizontal surface so that the bristles do not contact any surface.

In the method a) may be further practiced by supporting the substantially horizontal surface so that it is supported by two substantially upright walls and a base to define a support surface having an open polygonal configuration. Alternatively, a) may be further practiced by supporting the substantially horizontal surface using a central column and base, with the brushes disposed in a generally circular configuration around the central column.

In the method b) may be practiced by providing an elastomeric tube having a magnet cylinder or disc at one end and engaging a brush handle at the other, or by providing a disc shaped magnet between a metal end cap and an end of a brush handle.

It is the primary object of the present invention to provide for the simple, relatively inexpensive, and effective, mounting of a plurality of cosmetic brushes using magnets. This and other objects of the invention will become apparent from the detailed description of the drawings, and from the appended claims.

DETAILED DESCRIPTION OF THE DRAWINGS

Figure 1:
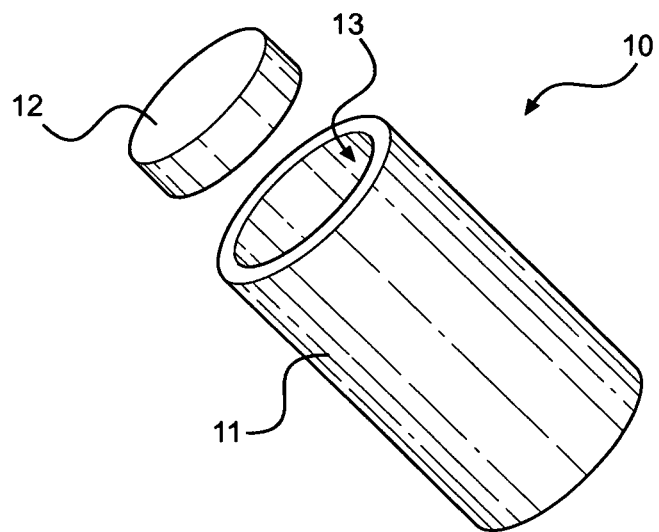
FIG. 1 is an exploded isometric view of the two basic components utilized according to the present invention, shown collectively by general reference numeral 10.
Figure 2:
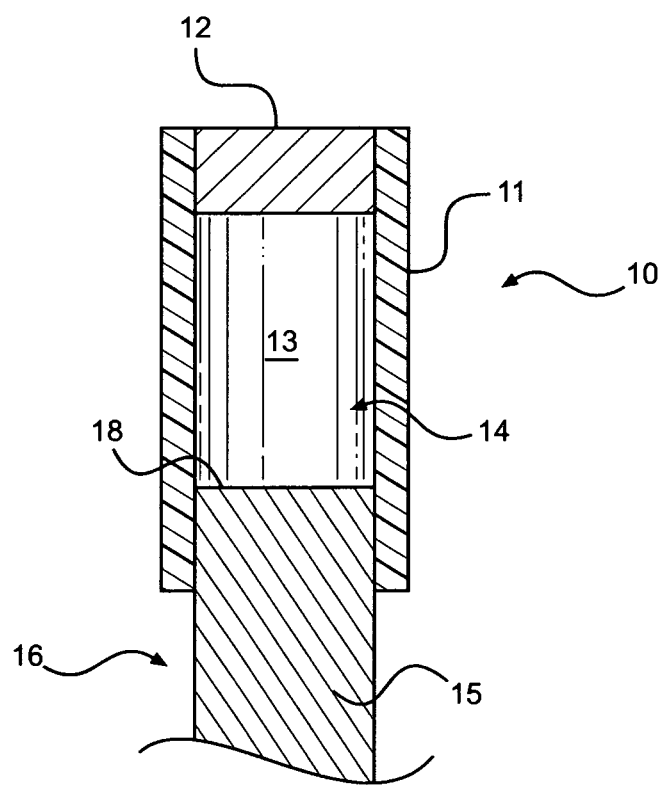
FIG. 2 is a schematic side view of the components of FIG. 1 with the elastomeric tube component shown in cross-section, and in combination with the handle of a conventional cosmetic brush.
Figure 3:
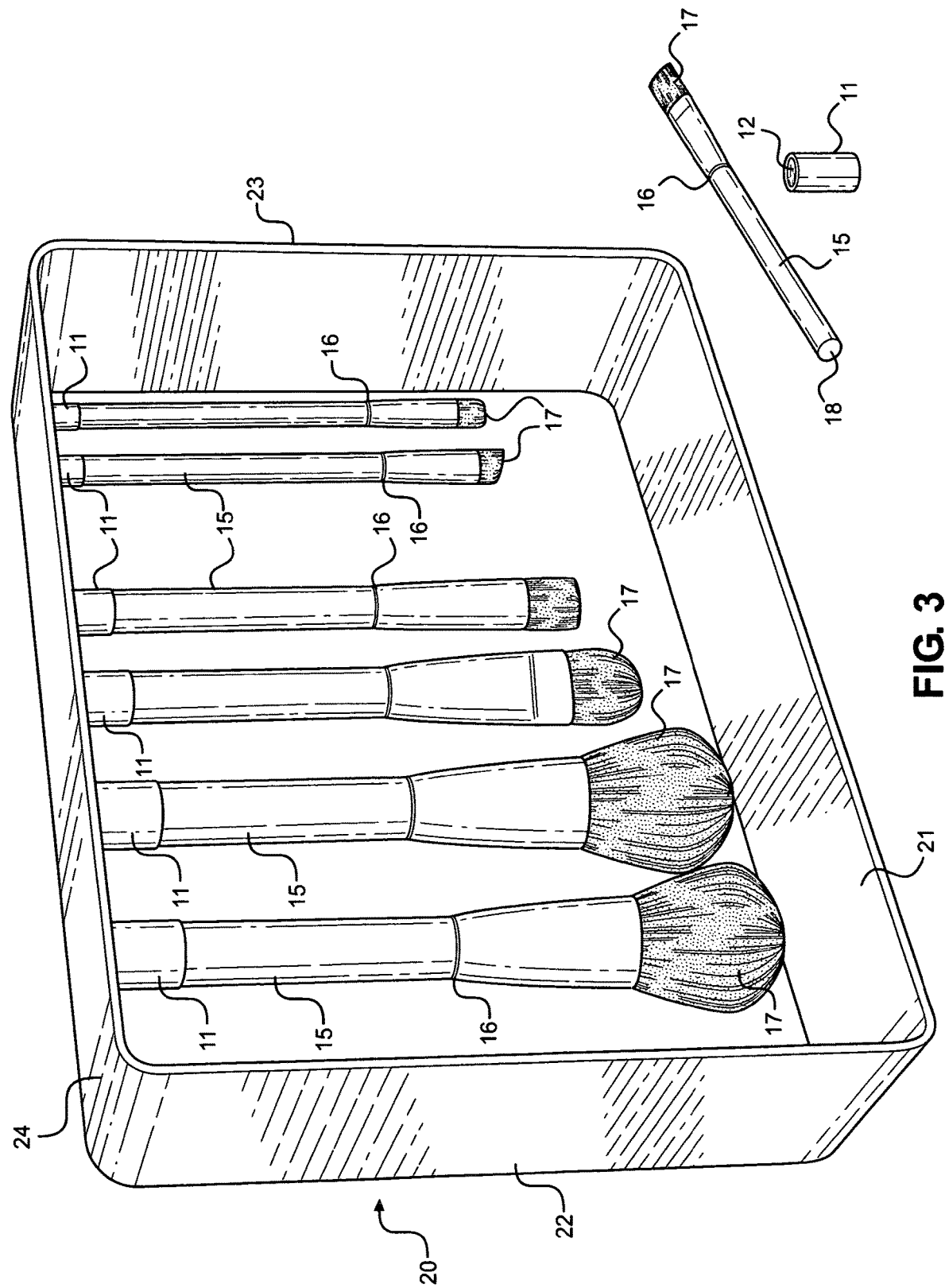
FIG. 3 is an isometric view of a storage system according to the invention for mounting a set of cosmetic brushes so that the brush bristles do not touch any structure during storage so that he bristles are not damaged, so that residual cosmetic material does not contaminate other brushes, and to allow a brush to quickly and effectively dry after cleaning with water or other liquid.

The two basic components of an article of manufacture according to the invention are illustrated by general reference numeral 10 in FIGS. 1-3. These two basic components comprise a hollow prism of elastomeric material 11, and a prismatically shaped permanent magnet 12. In the preferred embodiment illustrated the hollow prism 11 is a tube with a substantially circular cross-section (typically less than about two inches long with varying diameters depending on the diameters of the handles of brushes with which it is used), and the permanent magnet 12 is a substantially solid cylinder or disc, having a cross-section generally corresponding in shape and dimension to the interior of the tube 11 at one end thereof. However, other cross-sectional shapes of the components 11, 12 may be provided, including but not limited to, oval, quadrate, and hexagonal.

The dimensions of the components 11, 12 are selected so that the tube 11 will securely hold the magnet 12 in place. That is, typically the magnet 12 when disposed within the hollow interior 13 of the tube 11 at a first end thereof is engaged by the interior wall 14 of the elastomeric tube 11. In a preferred embodiment the inherent gripping force of the elastomeric material making up the tube 11 holds the magnet 12 in place. However, under some circumstances, where there is no need to ever remove the magnet 12 from the tube 11, an adhesive (not shown), fasteners, or other conventional mechanisms, may be provided to substantially permanently adhere the components 11, 12 together. The magnet 12 may be substantially flush with the first end of the tube 11 (as seen in FIG. 2), or it may extend above the end of the tube 11.

As shown in FIG. 2, where the tube 11 is shown in cross-section, the free end 18 of the brush handle 15 of a conventional cosmetic brush 16 is held in storage (and possibly use) position by tube 11 at the second, open, end thereof, opposite the end holding the magnet 12. The hollow interior 13 of the tube 11 and the exterior dimension of the brush handle 15 end 18 are such that the interior wall 14 of the elastomeric material tube 11 will tightly grip the brush handle end 18.

The elastomeric material of which the tube 11 is constructed is preferably silicone, although other conventional or equivalent elastomeric materials may be used. Preferably the elastomeric material has a durometer of between about 20-70 on the Shore A Scale.

Figure 4:
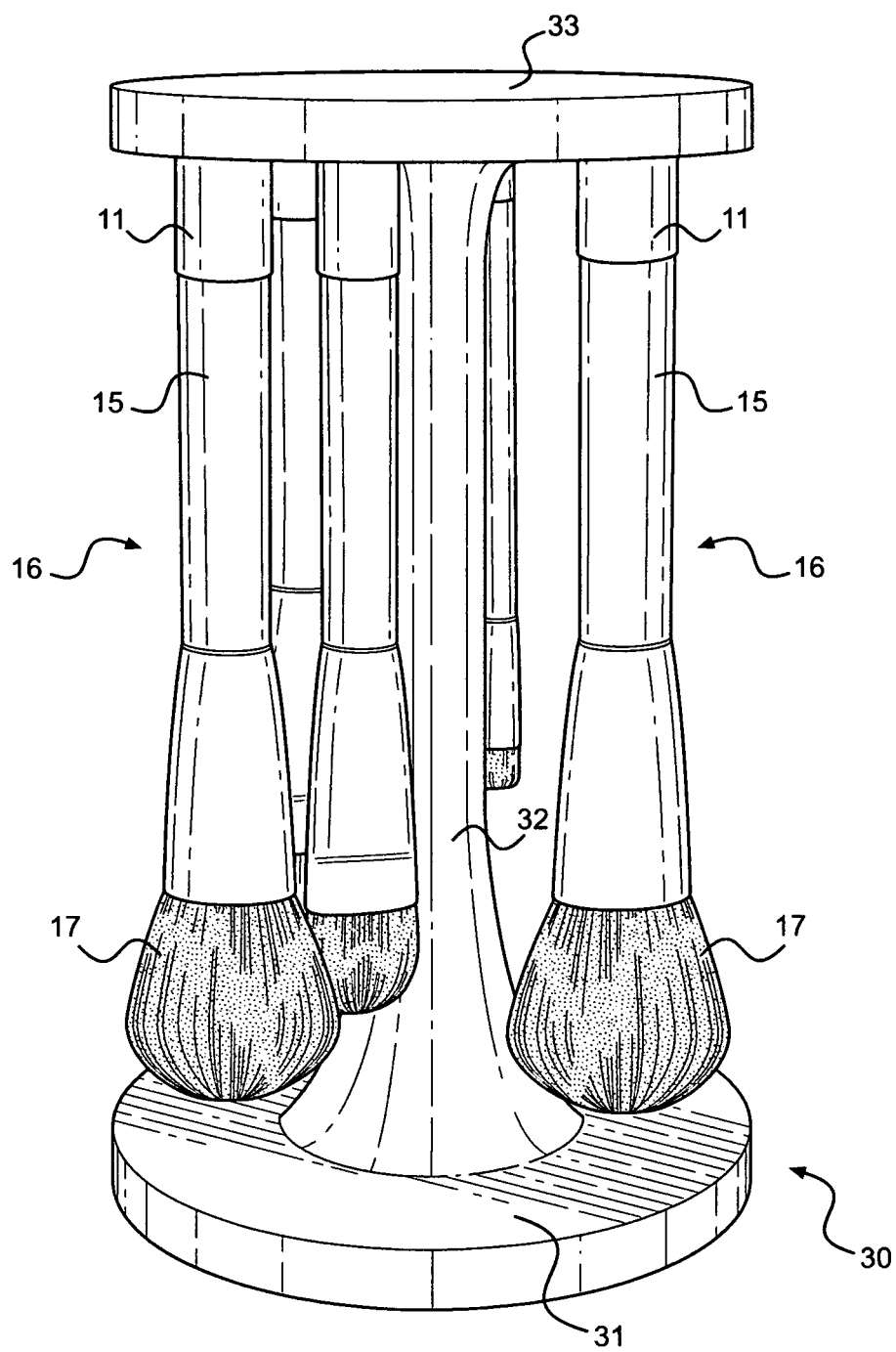
FIG. 4 is a view like that of FIG. 3 only for a different configuration of a storage system.

FIGS. 3 and 4 show systems or assemblies for mounting a set of cosmetic brushes 16, according to the invention, for example in combination with an article of manufacture like that of FIGS. 1 and 2. Each cosmetic brush 16 includes a handle 15 and bristles 17, and may be of any conventional type, and the handle 15 and bristles 17 may be made of any suitable conventional materials.

In the FIG. 3 embodiment the mounting storage system 20 preferably includes a substantially horizontal base 21, substantially upright sides 22, 23, and a substantially horizontal top surface 24. At least part of the substantially horizontal surface 24 (and preferably the entire surface 24) is of a magnetic material, e. g. steel, cobalt, iron alloys, some specialty plastics, or permanent magnets having a polarity that will attract the magnets 12. The components 21-24 define an open polygonal configuration, which is quadrate (e. g. rectangular) in the embodiment illustrated in FIG. 3.

As clearly illustrated in FIG. 3, an entire set of differently sized or bristle-type brushes 16 (seven brushes in the embodiment illustrated) are mounted by tubes 11 with magnets 12 therein, hanging from the top 24 of the system 20. In the case of system 20 there are between four and seven differently dimensioned brush handles 15 having ends (like 18 in FIG. 2 and the bottom right corner of FIG. 3), therefore there also are between four and seven differently dimensioned tubes 11 and magnets 12.

At the bottom right corner of FIG. 3, a tube 11, with magnet mounted therein, is shown detached from one of the brushes 16.

In the normal use of the brushes 16 of system 20, the user selects one of the brushes 16 of the set that is suitable for the particular cosmetic (e.g. eye shadow, foundation, blush, powder) to be applied, and the particular part of the user's body (e.g. cheek, eyelid, neck) to which it is to be applied. The user grasps the handle 15 of the desired brush 16 and pulls on it so that the pulling force overcomes the attraction between the magnet 12 and the system top 24 associated with that brush 16; or overcomes the gripping force of the tube 11 on the handle end 18.

Under some circumstances it will be convenient for the user to simply use the brush 16 with the tube 11 still attached to the handle 15, such as by putting the bristles 17 into contact with the desired cosmetic and then bringing it into contact with part of the user's body. In other circumstances, the user will detach the tube 11 from the handle 15 before using the brush 16 to apply a cosmetic. After use the user will then place the open end (the bottom end as shown in FIG. 2) of tube 11 into operative engagement with the end 18 of the handle 15 opposite the bristles 17, and then reattach the magnet 12 of that tube 11 to the magnetic material top 24 of the system 20.

When the brushes 16 are mounted by the system 20 as illustrated in FIG. 3 it is clear that the bristles 17 thereof will not touch any other structures so that they will not be damaged during storage and will not inadvertently transfer residual cosmetic material onto other surfaces, and so that they can quickly dry properly if washed with liquid.

The provision of the tube 11 has the advantage that the brushes 16 do not have to be specialty brushes that have magnets built into them. Rather any conventional brushes 16 may be utilized.

FIG. 4 illustrates another exemplary embodiment of a mounting system 30 according to the invention for mounting a set of cosmetic brushes 16. In this embodiment the system 30 includes a base 31, a central support column 32, and a substantially horizontal surface top 33. At least part of the surface 33 is made of magnetic material.

Figure 5:
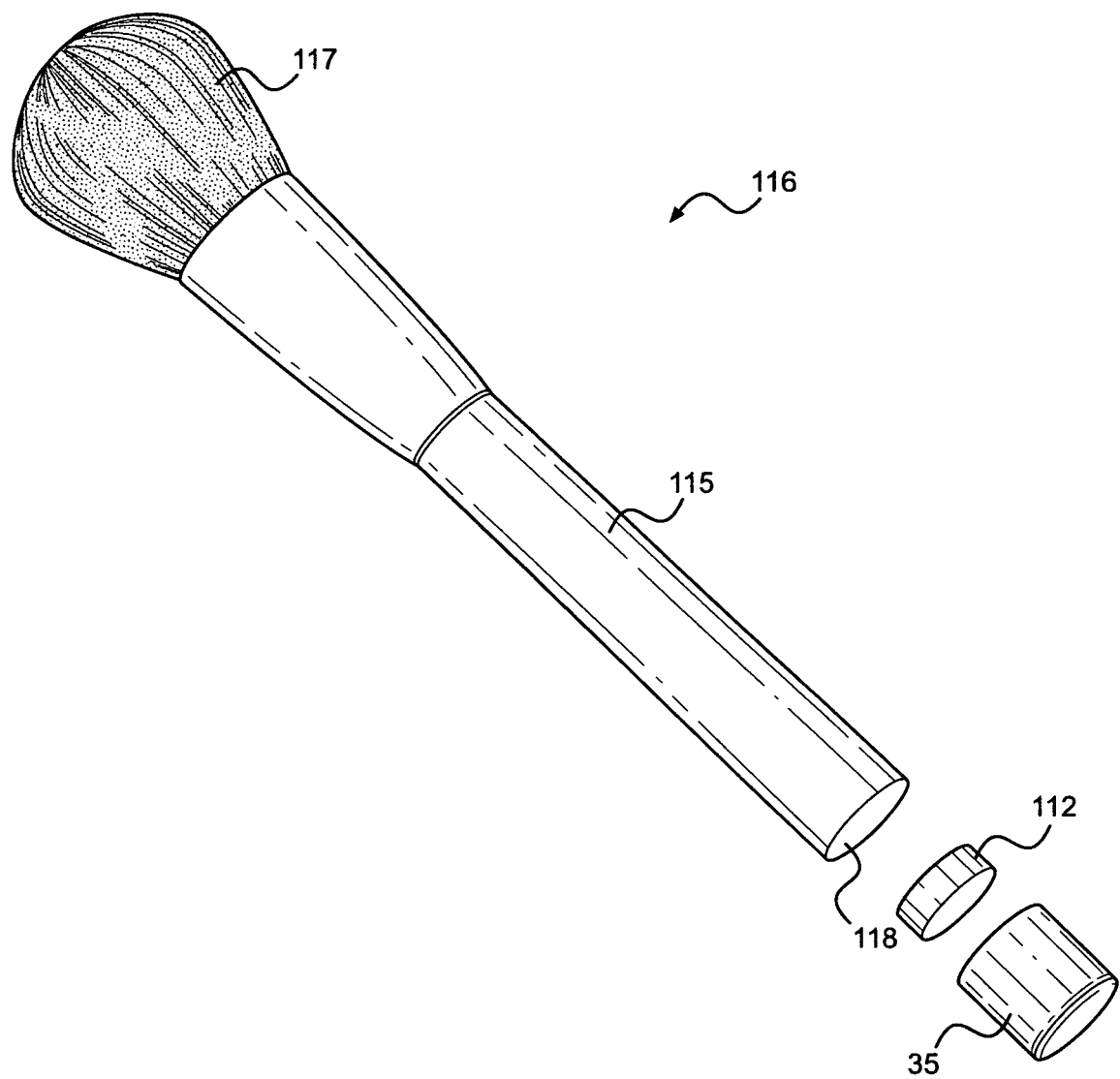
FIG. 5 is a perspective exploded view of an alternative configuration of cosmetic brush that can be utilized with the storage system of either FIG. 3 or 4.

The systems 20, 30 may also be used with other types of magnetic brushes. For example, the systems 20, 30 could be used with the brushes shown in U.S. Pat. No. 2,642,999 (24 in FIG. 2) or U S Printed Publication 2003/0000900; in that case, however, the entire system would not have the advantages associated with the tubes 11. Alternatively, the systems 20, 30 could be used with the brush 116 of FIG. 5 (where components with like functionality to those in the FIGS. 1-4 embodiment have the same reference numeral preceded by a "1"). In this case the disc-like magnet 112 abuts the free end 118 of the brush handle 115 opposite the bristles 117, and the magnet 112 is held in place by a cup-like metal cap 35 which fits over the exterior of the handle end 118 and has a tight fit or friction fit therewith (or is held in place by adhesive).

The invention also may relate to a method of mounting, storing, and using a plurality of different cosmetic brushes 16, 116 each having bristles 17, 117 and a handle 15, 115. The method comprises: a) Providing a substantially horizontal surface 24, 33 at least partially of magnetic material. b) Providing a magnet 12, 112, operatively associated (e. g. through tubes 11 or caps 35) with a portion 18, 118, of each of the handles 16, 116. And, c) vertically suspending the plurality of different cosmetic brushes 16, 116, supported by the magnets 12, 112 operatively engaging the substantially horizontal surface 24, 33, so that the bristles 17, 117 do not contact any surface.

While desirable exemplary embodiments have been illustrated, a wide variety of modifications may be made according to the invention. For example the tops 24, 33 of the systems 20, 30 may instead be the bottoms, so that the brush bristles 17 are above the handles 16 during storage. In that situation the durometer of the tubes 11 may be a little higher than when the tops 24, 33 are in fact above the handles 15.

As another alternative, instead of a permanent magnet the cylinder/prism 12 may be of magnetic material if the tops 24, 33, or parts of them, are permanent magnets themselves. All narrow ranges within a broad range are also specifically included.

The invention is to be accorded the broadest interpretation of the claims so as to encompass all equivalent systems, methods, articles of manufacture, and devices, limited only by the prior art.

What is claimed is:

1. An article of manufacture comprising: a hollow tube of elastomeric material with a cross-section that is selected from the group consisting of circular, oval, quadrate, and hexagonal, and having first and second ends; and a permanent magnet at said first end of said elastomeric material tube, said permanent magnet having a cross-section compatible with the cross-section of said tube; in combination with a handle of a cosmetic brush releasably disposed in said second end of said tube and releasably held in place by the gripping action of said elastomeric material of said tube.

2. A plurality of articles of manufacture as recited in claim 1 in combination with: a plurality of cosmetic brushes, each having a said tube and a said permanent magnet associated therewith; and a substantially horizontal surface at least partly of magnetic material large enough to accommodate said plurality of cosmetic brushes with said permanent magnets associated therewith engaging said horizontal surface so that said brushes are substantially vertical.

3. A combination as recited in claim 2 wherein said substantially horizontal surface is supported by two substantially upright walls and a base so that the brush bristles do not touch any other structures.

4. A combination as recited in claim 2 wherein said substantially horizontal surface is supported by a central column and a base.

5. An article of manufacture in combination with a cosmetic brush handle as recited in claim 1 wherein said elastomeric material is silicone, and has a durometer of about 20-70 on the Shore A Scale.

6. A system for supporting a plurality of cosmetic brushes each having bristles and a handle, said system comprising: a substantially horizontal surface at least partially of magnetic material and a support for said substantially horizontal surface; and a plurality of cosmetic brushes each having a magnet at an end of said handle opposite said bristles, said brushes supported at least in part by said magnets so that said bristles extend vertically downwardly from said horizontal surface so that said bristles do not engage any surface.

7. A system as recited in claim 6 wherein said substantially horizontal surface is supported by two substantially upright walls and a base to define a support structure having an open polygonal configuration.

8. A system as recited in claim 7 wherein said open polygonal configuration comprises a quadrate polygon.

9. A system as recited in claim 6 wherein said substantially horizontal surface is supported by a central column and a base.

10. A system as recited in claim 9 wherein said brushes are disposed in a generally circular configuration around said central column.

11. A method of mounting, storing, and using a plurality of different cosmetic brushes each having bristles and a handle, the method comprising: a) providing a substantially horizontal surface at least partially of magnetic material; b) providing a magnet operatively associated with an end of each of the brush handles opposite the bristles; and c) vertically suspending the plurality of different cosmetic brushes supported by the magnets operatively engaging the substantially horizontal surface so that the bristles do not contact any surface.

12. A method as recited in claim 11 wherein a) is further practiced by supporting the substantially horizontal surface so that it is supported by two substantially upright walls and a base to define a support surface having an open polygonal configuration.

13. A method as recited in claim 11 wherein a) is further practiced by supporting the substantially horizontal surface using a central column and base, with the brushes disposed in a generally circular configuration around the central column.

14. A method as recited in claim 11 wherein b) is practiced by providing an elastomeric tube having a magnet cylinder or disc at one end and engaging a brush handle at the other.

15. A method as recited in claim 11 wherein b) is practiced by providing a disc shaped magnet between a metal end cap and an end of a brush handle.

* * * * *